United States Patent [19]
Adamczyk et al.

[11] Patent Number: 5,577,961
[45] Date of Patent: Nov. 26, 1996

[54] METHOD AND SYSTEM FOR RESTRAINING A LEADER OBJECT IN A VIRTUAL REALITY PRESENTATION

[75] Inventors: John W. Adamczyk, Pasadena; Scott F. Watson, Glendale, both of Calif.

[73] Assignee: The Walt Disney Company, Burbank, Calif.

[21] Appl. No.: 267,786

[22] Filed: Jun. 28, 1994

[51] Int. Cl.$^6$ ................................................. G06F 15/00
[52] U.S. Cl. .......................... 463/33; 395/119; 395/326
[58] Field of Search .................. 395/119–127, 155–161; 345/117–120, 7–8; 463/32–33

[56] References Cited

U.S. PATENT DOCUMENTS

| | | | |
|---|---|---|---|
| 4,600,200 | 7/1986 | Oka et al. | 463/33 |
| 4,789,962 | 12/1988 | Berry et al. | 395/155 |
| 5,221,083 | 6/1993 | Dote | 463/32 |
| 5,287,448 | 2/1994 | Nicol et al. | 395/159 |
| 5,423,554 | 6/1995 | Davis | 463/33 |
| 5,428,733 | 6/1995 | Carr | 395/159 |
| 5,434,965 | 7/1995 | Matheny et al. | 395/159 |
| 5,436,637 | 7/1995 | Gayraud et al. | 395/155 X |
| 5,528,735 | 6/1996 | Strasnick et al. | 395/127 |

*Primary Examiner*—Mark R. Powell
*Assistant Examiner*—John E. Breene
*Attorney, Agent, or Firm*—Fish & Neave; Jeffrey H. Ingerman

[57] ABSTRACT

A virtual reality system is provided in which a user can be assured of reaching a destination in a virtual world within a specific time while providing the impression that the user is free to roam the virtual space at will. A virtual leader is projected in front of the user by the system. The virtual leader appears to lead the user but is actually linked to a virtual stick connected to the user, so that as the user moves or turns, the leader moves or turns to stay at substantially the same position relative to the user.

22 Claims, 4 Drawing Sheets

METHOD AND SYSTEM FOR RESTRAINING A LEADER OBJECT IN A VIRTUAL REALITY PRESENTATION

BACKGROUND OF THE INVENTION

This invention relates to methods and systems for presenting virtual reality experiences to a user. More particularly, this invention relates to such systems where the virtual reality experience is constrained.

In theory, a user presented with a virtual reality experience should be able to enter a virtual world or space and roam through that world or space at will, interacting as he or she desires with anything that may be found there, and spending as much time as desired without reaching any particular destination or objective. However, in certain practical virtual reality presentations, the experience may be constrained. For example, the amount of computing power necessary to present a true, unconstrained virtual reality experience is very large, and very expensive. The cost of that amount of computing power would likely be prohibitive in the context of, for example, an amusement-type virtual reality attraction. Thus, it is necessary to limit the options given a user or "guest" in such an experience, while at the same time giving the guest the impression that he or she can move anywhere and do anything in the virtual space.

Moreover, each guest can only be given a limited time in the virtual world, so that other guests can have an opportunity to share the virtual experience. Thus, in a time-constrained virtual reality amusement attraction, one cannot give a guest unlimited time to reach the goal of the attraction.

One way to prevent a guest from taking too much time in reaching the goal is to present the guest with a fast-moving experience in which he or she is caught up and swept along. Such an experience would psychologically lead the guest in certain directions, minimizing the tendency of the guest to explore portions of the virtual space that divert him or her away from the goal. However, such a technique cannot be guaranteed to prevent the guest from going where he or she should not go, and so it still could not be assured that the guest would reach a desired objective within the time allotted.

It would be desirable to be able to provide a virtual reality system in which a user could be assured of reaching a destination in a virtual world within a specific time while providing the impression that the user is free to roam the virtual space at will.

SUMMARY OF THE INVENTION

It is an object of this invention to provide a virtual reality system in which a user could be assured of reaching a destination in a virtual world within a specific time while providing the impression that the user is free to roam the virtual space at will.

In accordance with the present invention, there is provided a method of presenting a user with a virtual reality experience in a virtual world, wherein said user follows a virtual object to a goal in the virtual world. The method includes projecting the virtual world in the field of view of the user, and projecting the virtual object in the virtual world. The user is allowed to select a path along which to travel through the virtual world toward the goal. The virtual object is restrained to remain within a defined distance of the user as the user travels through the virtual world, in such a way that the virtual object appears to the user to be leading the user toward the goal.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
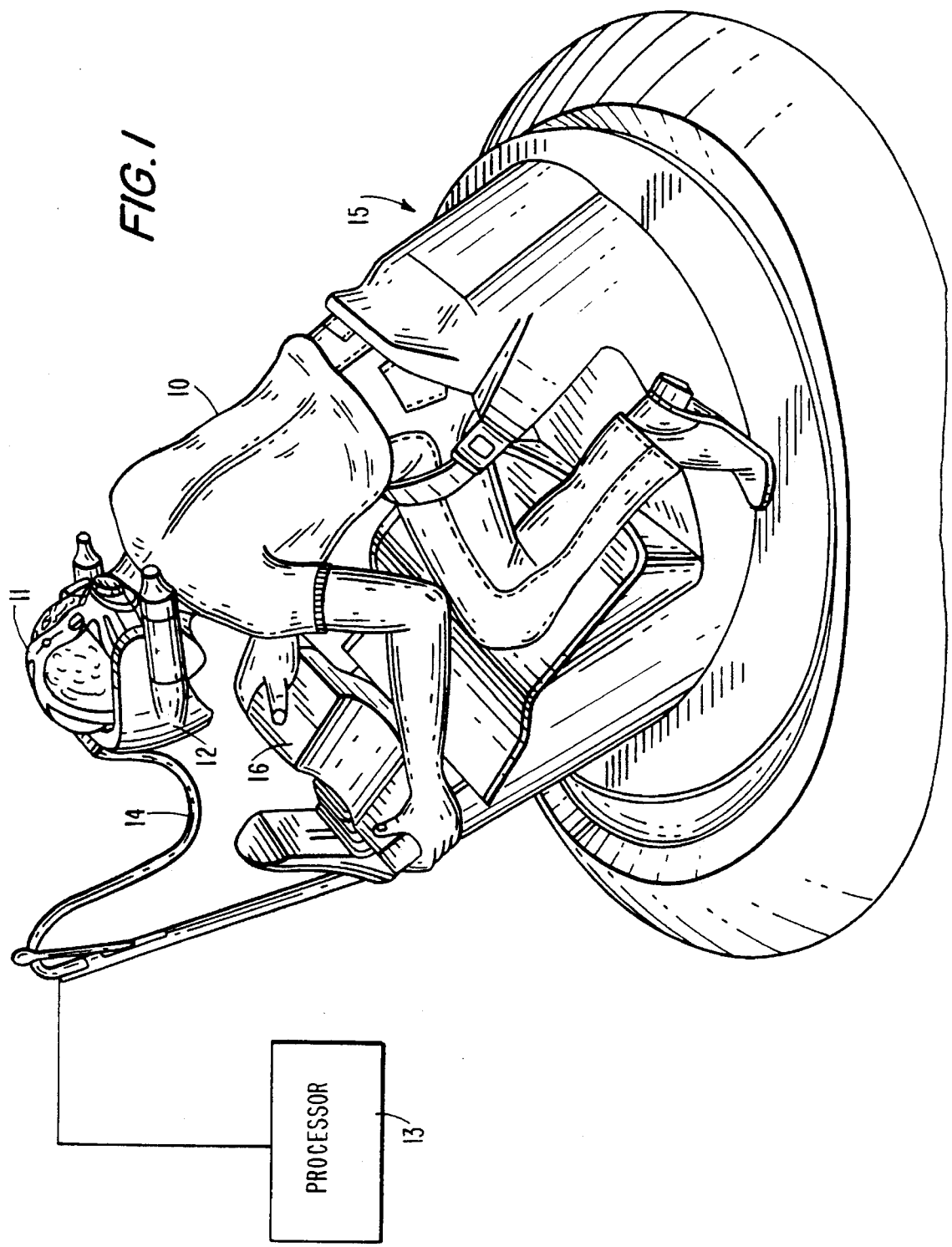
FIG. 1 is a perspective view of a user equipped to experience a virtual reality experience according to the present invention.

The present invention is useful in a virtual reality simulation in which the user is expected to follow a leader to reach a goal at a defined time, but not in any defined location. Specifically, the user is to be allowed to go anywhere he or she wants in the virtual world, but it must appear that the leader is leading him or her there. After a predetermined elapsed time, the goal will appear before the user.

According to the invention, movement of the leader is directly controlled by the user's movements. In particular, the leader might remain at a fixed location relative to the user's body, so that the leader follows movements of the user or any vehicle or conveyance in or on which the user is riding, but if the user merely turns his or her head, the leader does not follow. In order to enhance the illusion that the user is following the leader, the location relative to the user's body can be a target point, and the leader can be made to oscillate in a regular or irregular (e.g., pseudo-random) manner about the target point. The effect is similar to a carrot dangling on the end of a stick attached to the user's shoulder. As the user moves, the end of the stick remains at a fixed relative position, but the carrot bounces around as it dangles on the string.

To add additional realism to the illusion, the target point could itself move relative to the user. Preferably, if the target point moves, it moves less than, or more slowly than, the leader. The illusion then becomes one of a moth following a firefly inside a jar at the end of a stick attached to the user's body.

The length of the "string" (or the diameter of the "jar") should preferably be selected to maximize the reality of the illusion. Thus, the leader should be allowed to move temporarily to the side out of the user's forward view (although if the user were to turn his or her head, he or she could still see the leader), or even behind the user. However, the leader should not be allowed to move so far that the user must spend inordinate amounts of time trying to reacquire the leader's position. Thus a balance must be struck in determining how far to allow the leader to move.

The invention is illustrated in the FIGURES in the context of a particularly preferred embodiment of a virtual reality simulation in which the user believes that he or she is flying a magic carpet through a desert to reach a treasure cave. The cave has a secret entrance to which the leader appears to guide the user. When the user reaches the cave, there are several chambers through which the user must fly, connected by narrow passageways or doorways, eventually leading to a treasure. In the portion of the experience inside the cave, the user must be led through the caves on a predetermined path while being given the impression that he or she may go anywhere in the cave. That result is achieved in accordance with the invention described and claimed in copending, commonly-assigned U.S. patent application Ser. No. 08/267,184, (WDI-21), filed concurrently herewith and hereby incorporated by reference in its entirety.

However, before the user reaches the cave, there is no particular reason to constrain him or her to any particular path through the desert. Indeed, it is preferable to give the user flying experience without regard to where he or she flies, because that experience will be needed in the closer confines of the cave. Instead of constraining the user to a path in the desert, then, the user preferably is allowed to follow any path he or she desires and the simulation preferably is constrained in time so that no matter where in the desert the user is at a predetermined time, the secret entrance appears. The leader appears to the user to have guided him or her to the secret entrance, but in fact the leader has merely followed the user's movements.

FIG. 1 shows a user 10 equipped to experience a virtual reality simulation in accordance with the present invention. The user preferably wears a helmet 11 including a head-mounted display 12 which fills the user's field of view with the substantially binocular output of processor 13, to which it is connected by cable 14. Head-mounted display 12 preferably also includes sensors (not shown) to determine the user's head movements, so that no matter where user 10 may turn his or her head, display 12 will project an image that realistically follows the user's head movements. User 10 is preferably sitting on a motion base 15 which moves to simulate the motion of, in the preferred embodiment, a magic carpet, in response to user manipulation of control device 16 which is disguised to feel, in the preferred embodiment, like the edge of a carpet. Alternatively, the user may be sitting in a real vehicle of the type projected in the virtual world.

Processor 13 may suitably be an ONYX Reality Engine 2 parallel computer from Silicon Graphics, Inc., of Mountain View, Calif., having eight parallel central processing units. A particularly preferred helmet 11 is described in copending, commonly-assigned U.S. patent application Ser. No. 08/267,183, filed concurrently herewith and hereby incorporated by reference in its entirety. A particularly preferred head-mounted display is described in copending, commonly-assigned U.S. patent application Ser. No. 08/267,187, filed concurrently herewith and hereby incorporated by reference in its entirety. A particularly preferred motion base 15 is described in copending, commonly-assigned U.S. patent application Ser. No. 08/267,787, filed concurrently herewith and hereby incorporated by reference in its entirety. A particularly preferred control device 16 is described in copending, commonly-assigned U.S. patent application Ser. No. 08/267,429, (WDI-24), filed concurrently herewith and hereby incorporated by reference in its entirety.

Figure 2:
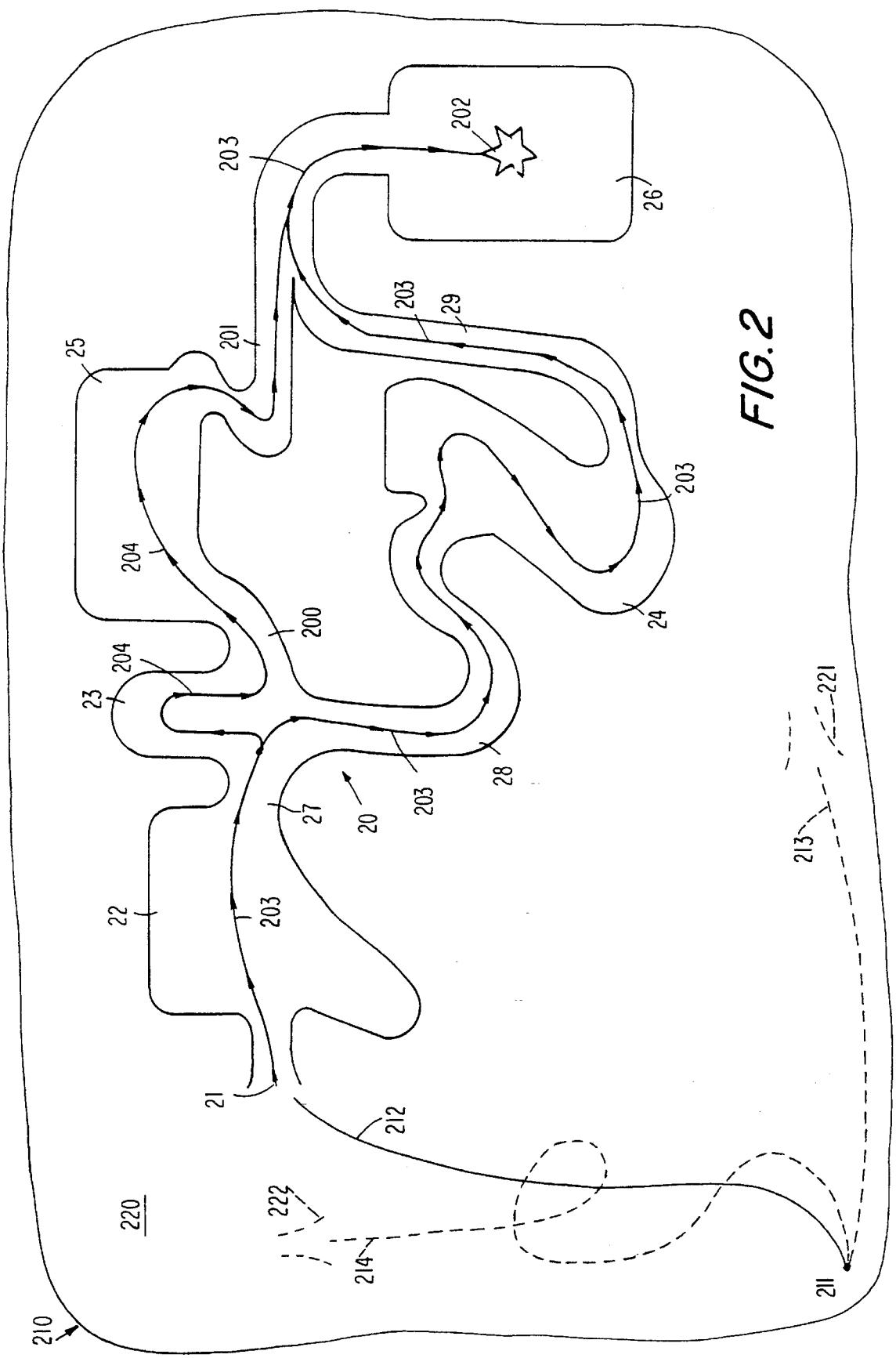
FIG. 2 is a schematic plan view of a virtual world which can be presented by the present invention.

The invention can be explained by reference to virtual world 210, shown schematically in FIG. 2. Virtual world 210 includes a desert 220 in which there is a cave 20 having a mouth 21 and a plurality of chambers 22, 23, 24, 25 and 26 interconnected by passageways 27, 28, 29, 200 and 201. The user's objective is to find cave 20, and then to successfully navigate the cave, surviving various perils (not shown) to reach chamber 26 which contains a treasure indicated by starburst 202.

Virtual world 200 preferably is projected onto display 12 by processor 13, which preferably also defines within cave 20 a nominal path 203, and an alternative nominal path 204, both of which lead to treasure 202, but through different chambers and passageways.

Processor 13 preferably also projects guide 30 (shown schematically in FIGS. 3–4B), which in the preferred embodiment may take the form of a talking bird or a magical inanimate object capable of movement or flight, for "guiding" the user from a starting point 211 to the mouth 21 of cave 20.

As stated above, the user preferably can take any path through desert 220, and preferably after a predetermined time period has elapsed, mouth 21 of cave 20 will appear before the user. As shown in FIG. 2, mouth 21 has appeared at the end of user-defined path 212. However, the cave mount could also appear at 221 at the end of path 213 if the user chooses that path, or at 222 at the end of path 214 if the user chooses that path. Of course, the user could choose any other path desired through desert 220 and the cave mouth will appear at the user's location at the predetermined time. Once the cave mouth appears, the interior of the cave 20 is the same for all users, who are guided through the cave in accordance with the invention described and claimed in said above-incorporated patent application Ser. No. 08/267,184.

Figure 4B:
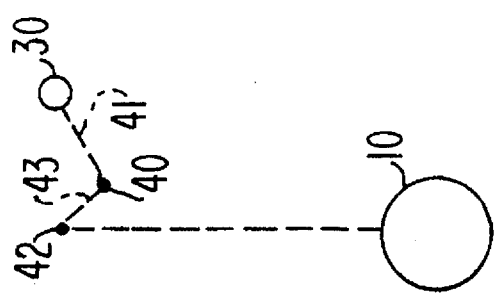
FIGS. 4A and 4B are schematic representations of how the leading object appears to guide the user.
Figure 3:
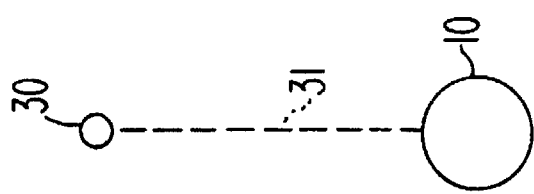
FIG. 3 is a schematic representation of a leading object virtually tethered to a user in accordance with the present invention.

While the user is following path 212, 213 or 214 (or any other path), he or she is being "led" by leader 30, shown schematically in FIGS. 3–4B. As explained above, leader 30 does not in fact lead user 10, but is instead virtually linked to user 10 by virtual rigid link 31. Thus, in the simplest embodiment, shown in FIG. 3, wherever user 10 goes, leader 30 is always out ahead of him or her. Link 31 is not connected to the user's head, allowing user 10 to move his or her head without affecting the course of leader 30. Instead, link 31 is connected to the user's body or, in the preferred embodiment, to his ride vehicle (magic carpet). In order to vary the experience, and to mask the link effect, the "fixed" relative position of leader 30 relative to user 10 may be dynamically changeable by processor 13—i.e., the fixed relative position may change during the virtual reality experience.

Figure 4A:
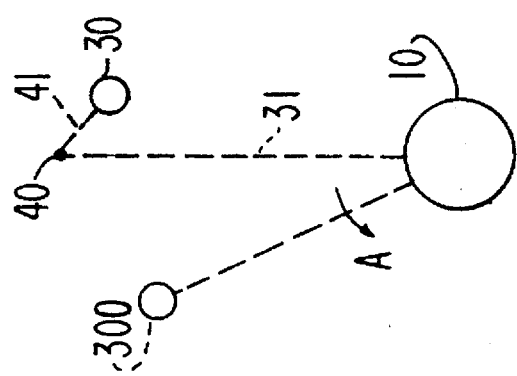

A more particularly preferred way of varying the experience and masking the linking effect is shown in FIG. 4A where link 31 connects user 10 not to leader 30, but to a target point 40 which is at a fixed position relative to user 10. In turn, leader 30 is linked by offset link 41 to target point 40. Leader 30 thus moves randomly, or pseudo-randomly, about point 40, constrained by offset link 41 to remain within a defined distance of point 40. Although the length of offset link 41 is shown as shorter than that of link 31, it may in fact be longer to allow leader 30 to move, at least temporarily, behind user 10. And as discussed in connection with FIG. 3, the lengths of both links 31, 41 could be dynamically changeable.

A third embodiment is shown in FIG. 4B. There, point 40 is also allowed to move in a random or pseudo-random manner. One way of visualizing that motion is as though point 40 were connected by second offset link 43 to fixed point 42.

Thus, if user 10 flies and turns his or her vehicle (carpet) in the direction arrow A (FIG. 4A), leader 30 will, after a suitable delay, appear at point 300 to again be in front of user 10. If leader 30 is a talking character, it might say something at that point like "You'd better keep following me if you want to find it!", as though user 10's path through desert 220 actually mattered.

Figure 5:
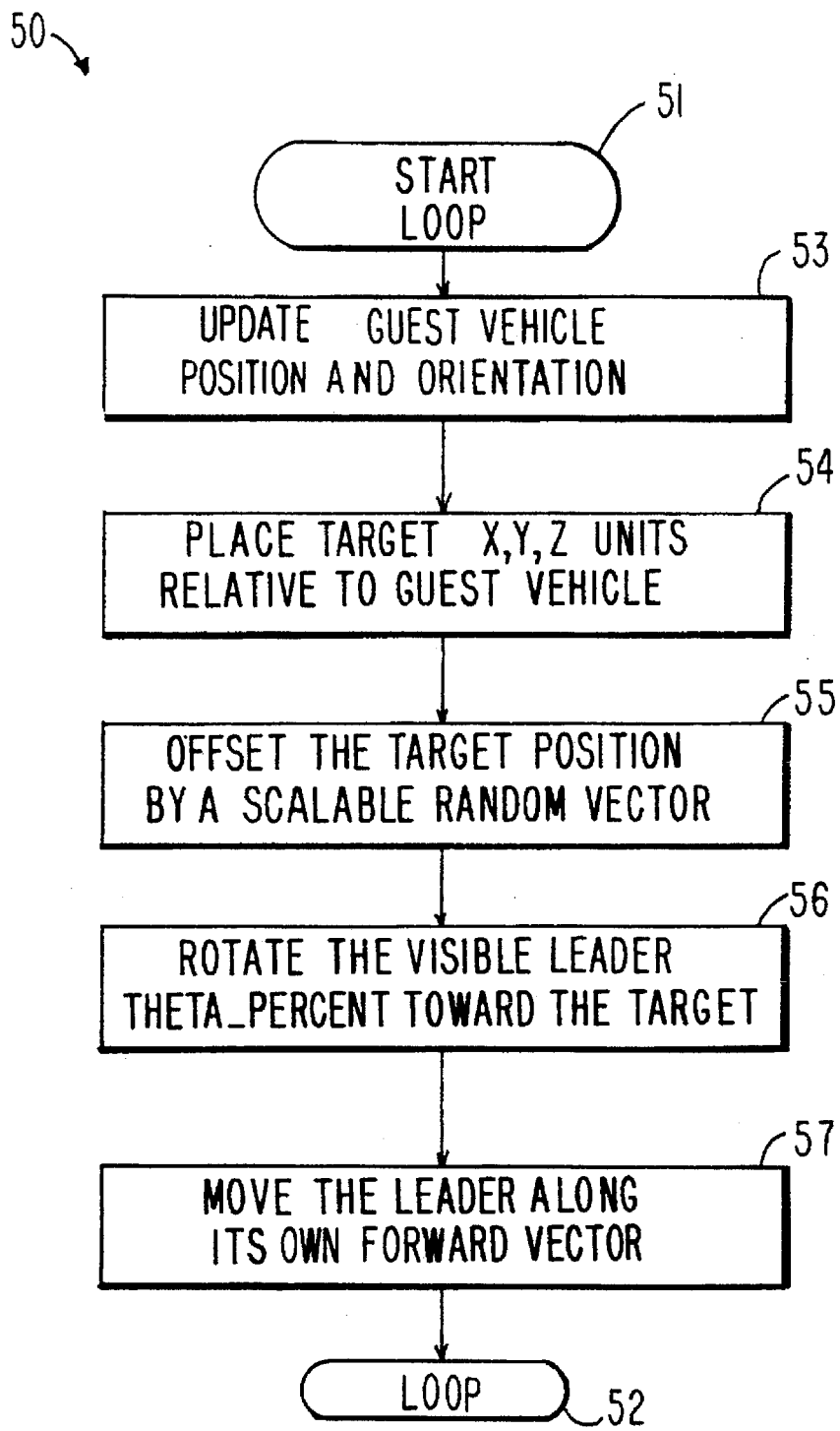
FIG. 5 is a flow diagram of a preferred embodiment of a computer program routine for implementing the leading object according to the invention.

FIG. 5 shows a flow diagram of a preferred embodiment of a software routine 50 for implementing the present invention. Routine 50 is preferably a loop, starting at 51 and ending at 52, within the larger virtual reality simulation program (not shown), which preferably is executed substantially continually in processor 13 to update the user's speed and position (e.g., once for every frame of the projected animation).

At step 53, the system updates the position and orientation of the user's vehicle by referring to some other variable produced elsewhere in the overall simulation program (not shown). At step 54, the system updates the position of the invisible target point 40 so that target point 40 remains at location (X,Y,Z) relative to user 10. Of course, as discussed above, the coordinates (X,Y,Z) could be constant (i.e., the same each time loop 50 reaches step 54) or dynamically changeable. At step 55, target point 40 is moved by a random scalable vector amount. At step 56, the system rotates leader 30 by a predetermined percentage (THETA_PERCENT) of its angular offset from the new position of target point 40, so that leader 30 is pointing more toward point 40 than it was after point 40 was moved in step 55, but is not pointing directly toward point 40 (to avoid sudden changes in direction). Finally, in step 57, leader 30 is moved along its own forward vector which, as defined by step 56, is not directly toward point 40, so that a random-appearing flight path of leader 30 results. Preferably, the speed of leader 30 in step 57 is directly proportional to its distance from point 40, to enhance the apparent randomness of the flight of leader 30.

When routine 50 is being executed, user 10 is in desert 220 and has not yet reached cave 20. As stated above, the system at that point does not care where user 10 chooses to go. Thus routine 50 does not attempt to affect user position in the virtual world. Routine 50 is concerned with user position only in step 53 to the extent that user position must be known to keep target point 40 at coordinates (X,Y,Z) relative user 10. That is what allows leader 30 to stay in front of user 10. Similarly, the rotation of leader 30 by only THETA_PERCENT of its angular offset from target 40 prevents sudden changes of direction as discussed above; leader 30 only gradually follows as user 10 changes direction.

Thus it is seen that a virtual reality system is provided in which a user can be assured of reaching a destination in a virtual world within a specific time while providing the impression that the user is free to roam the virtual space at will. One skilled in the art will appreciate that the present invention can be practiced by other than the described embodiments, which are presented for purposes of illustration and not of limitation, and the present invention is limited only by the claims that follow.

What is claimed is:

1. A method of presenting a user with a virtual reality experience in a virtual world, wherein said user follows a virtual object to a goal in said virtual world, said user having a field of view, said method comprising:

projecting said virtual world in the field of view of said user;

projecting said virtual object in said virtual world;

allowing said user to select a path along which to travel through said virtual world toward said goal; and restraining said virtual object to remain within a defined distance of said user as said user travels through said virtual world; whereby:

said virtual object appears to said user to be leading said user toward said goal.

2. The method of claim 1 further comprising presenting said goal to said user on occurrence of a constraint regardless of said path selected by said user and regardless of location of said user in said virtual world on occurrence of said constraint.

3. The method of claim 2 wherein said constraint is time.

4. The method of claim 1 further comprising the step of dynamically changing said defined distance as said user travels in said virtual world.

5. The method of claim 1 wherein said restraining step comprises causing said virtual object to move within said field of view of said user, and to move out of said field of view of said user, while said virtual object moves within said defined distance from said user.

6. The method of claim 5 wherein said virtual object remains at most times within said field of view of said user.

7. The method of claim 1 wherein said virtual object accelerates and decelerates while remaining within said defined distance of said user.

8. The method of claim 1 wherein said step of projecting said virtual world in said field of view of said user comprises placing said user in a vehicle.

9. The method of claim 8 wherein said placing step comprises placing said user in a real vehicle.

10. The method of claim 8 wherein said placing step comprises placing said user in a virtual vehicle.

11. The method of claim 8 wherein said restraining step comprises restraining said virtual object to remain within a defined distance of said vehicle.

12. A system for presenting a user with a virtual reality experience in a virtual world, wherein said user follows a virtual object to a goal in said virtual world, said user having a field of view, said system comprising:

a virtual world projector for projecting said virtual world in the field of view of said user;

a virtual object projector for projecting said virtual object in said virtual world;

a user input for allowing said user to select a path along which to travel through said virtual world toward said goal; and a virtual object restrainer for restraining said virtual object to remain within a defined distance of said user as said user travels through said virtual world; whereby:

said virtual object appears to said user to be leading said user toward said goal.

13. The system of claim 12 further comprising a goal presenter for presenting said goal to said user on occurrence of a constraint regardless of said path selected by said user and regardless of location of said user in said virtual world on occurrence of said constraint.

14. The method of claim 13 wherein said constraint is time.

15. The system of claim 12 further comprising a dynamic defined distance changer for dynamically changing said defined distance as said user travels in said virtual world.

16. The system of claim 12 wherein said virtual object restrainer causes said virtual object to move within said field of view of said user, and to move out of said field of view of said user, while said virtual object moves within said defined distance from said user.

17. The system of claim 16 wherein said virtual object remains at most times within said field of view of said user.

18. The system of claim 12 wherein said virtual object accelerates and decelerates while remaining within said defined distance of said user.

19. The system of claim 12 further comprising a real vehicle in which said user travels in said virtual world.

20. The system of claim 19 wherein said virtual object restrainer restrains said virtual object to remain within a defined distance of said real vehicle.

21. The system of claim 12 wherein said virtual world projector places said user in a virtual vehicle in said virtual world.

22. The system of claim 21 wherein said virtual object restrainer restrains said virtual object to remain within a defined distance of said virtual vehicle.

* * * * *